United States Patent
Glover

(10) Patent No.: US 9,247,710 B2
(45) Date of Patent: Feb. 2, 2016

(54) CAT CARRIER WITH DESTABILIZING SLIDING FLOOR

(71) Applicant: K-Kat LLC, Westby, WI (US)

(72) Inventor: Theodore J. Glover, Westby, WI (US)

(73) Assignee: K-Kat LLC, Westby ( * ) Notice: Subject to any disclaimer, the term of this patent is extended or adjusted under 35 U.S.C. 154(b) by 0 days.

(21) Appl. No.: 14/589,533

(22) Filed: Jan. 5, 2015

(65) Prior Publication Data

US 2015/0114306 A1    Apr. 30, 2015

Related U.S. Application Data

(63) Continuation of application No. 14/156,331, filed on Jan. 15, 2004, now Pat. No. 8,925,491.

(60) Provisional application No. 61/849,882, filed on Feb. 5, 2013.

(51) Int. Cl.
*A01K 1/02* (2006.01)

(52) U.S. Cl.
CPC .................................... *A01K 1/0245* (2013.01)

(58) Field of Classification Search
USPC ......... 119/428, 429, 430, 431, 432, 452, 453, 119/454, 455, 456, 458, 459, 461, 462, 463, 119/464, 472, 473, 474, 475, 479, 480, 481, 119/482, 496, 497, 498, 501, 161, 165, 512, 119/513, 751, 752
See application file for complete search history.

(56) References Cited

U.S. PATENT DOCUMENTS

| | | | | | |
|---|---|---|---|---|---|
| 1,303,736 | A | * | 5/1919 | Speicher | 119/487 |
| 1,345,968 | A | * | 7/1920 | Speicher | 119/487 |
| 3,100,474 | A | * | 8/1963 | Schneider | 119/166 |
| 4,140,080 | A | * | 2/1979 | Snader | 119/473 |
| 5,054,426 | A | * | 10/1991 | Panarelli et al. | 119/473 |
| 5,785,000 | A | * | 7/1998 | Barbary | 119/166 |
| 5,890,329 | A | * | 4/1999 | Krueger | 52/106 |
| 7,500,449 | B2 | * | 3/2009 | Carter | 119/429 |
| 7,681,532 | B1 | * | 3/2010 | Deane | 119/473 |
| 2002/0092477 | A1 | * | 7/2002 | Ross | 119/496 |
| 2006/0065206 | A1 | * | 3/2006 | Carter | 119/429 |

* cited by examiner

*Primary Examiner* — Trinh Nguyen
(74) *Attorney, Agent, or Firm* — Vidas, Arrett & Steinkraus

(57) ABSTRACT

A portable cat carrier has a sliding floor that momentarily and mildly destabilizes a cat's footing to facilitate transferring the cat in and out of the carrier. The floor is the bottom portion of a movable insert that has a receptacle for receiving the cat. The insert has relatively low side panels to provide the cat with a calming, unrestricted side view. After the cat is lowered into the receptacle, the insert is slid horizontally into an outer housing for containing the cat. When the insert is fully inserted within the housing, a front panel of the insert closes the housing's access opening to prevent the cat from escaping. A back panel of the insert has an elevated impassable rear barrier that prevents the cat from jumping into a trapped area between the insert and the outer housing.

20 Claims, 10 Drawing Sheets

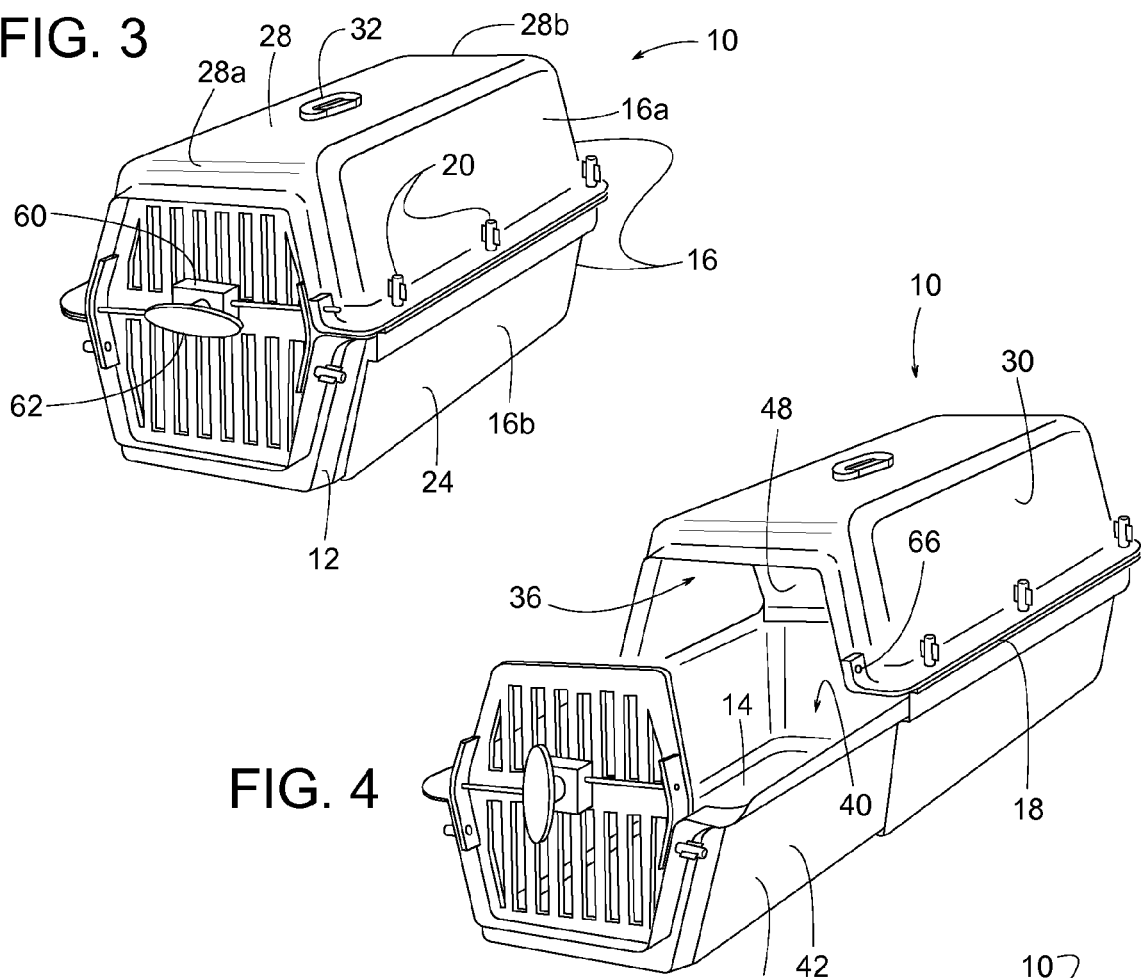
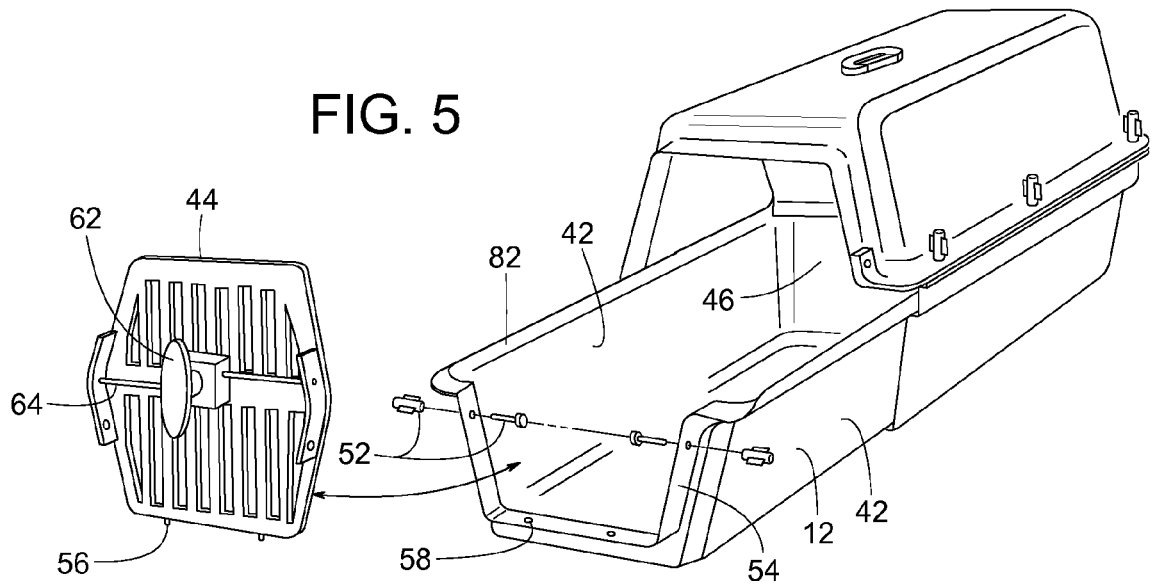

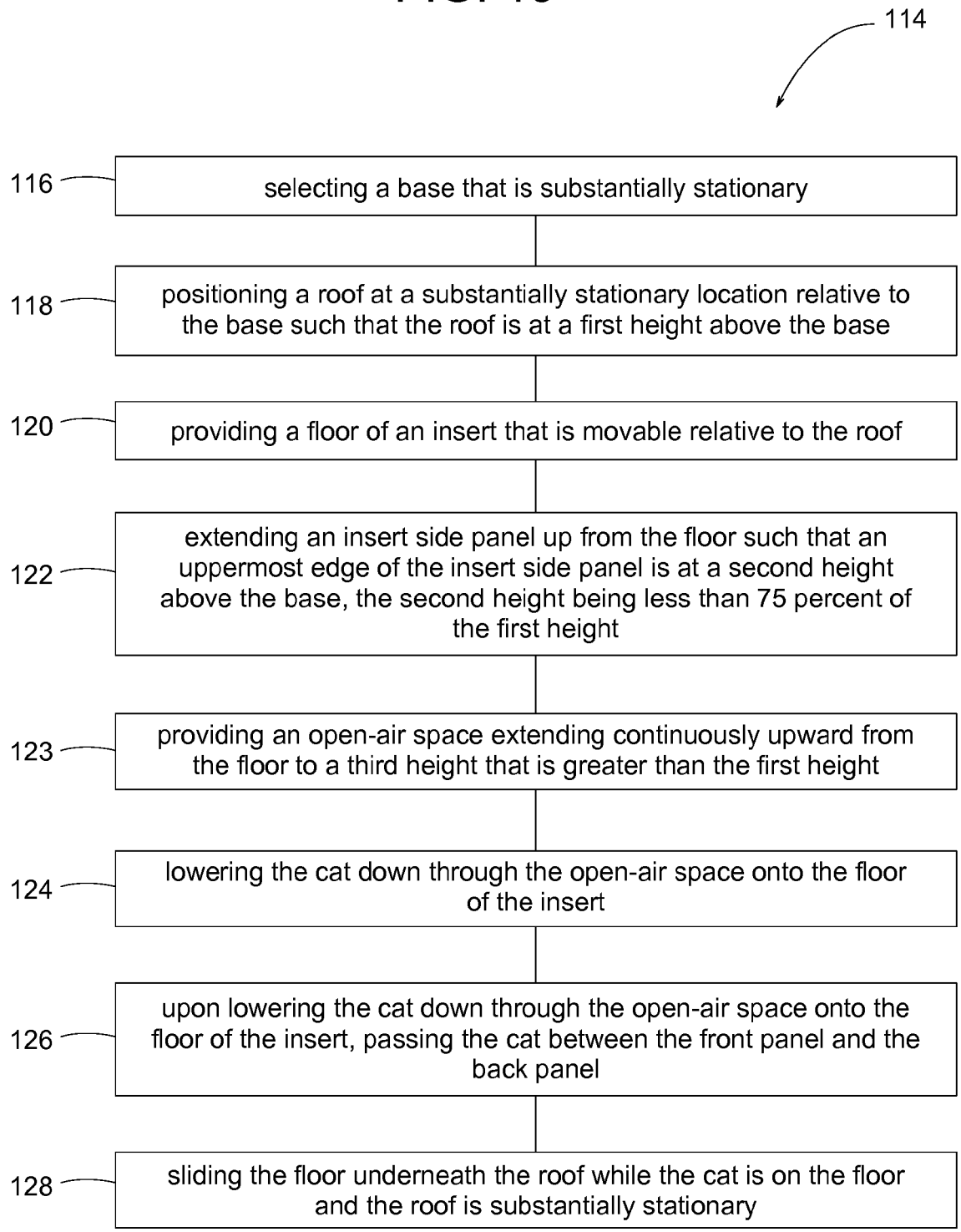

CAT CARRIER WITH DESTABILIZING SLIDING FLOOR

CROSS REFERENCE TO RELATED APPLICATIONS

This application is a continuation application of U.S. patent application Ser. No. 14/156,331, filed Jan. 15, 2014, which claims the benefit of provisional patent application No. 61/849,882 filed on Feb. 5, 2013, the entire disclosures of which are hereby incorporated herein by reference.

FIELD OF THE DISCLOSURE

The present disclosure relates generally to pet carriers and more specifically to carriers for cats.

BACKGROUND

Pet carriers are portable enclosures for temporarily housing and/or transporting small domestic animals, such as cats and dogs. Unlike dogs, birds and other pets, cats have a unique combination of characteristics that can make them particularly difficult to handle and control. Cats usually are very alert, have quick reflexes, have a good sense of balance, are extremely agile and can be rather skittish under certain circumstances. These qualities in combination with a cat's sharp claws can render general purpose pet carriers unsuitable for handling cats. At times, it can be difficult to safely transfer unwilling cats to or from conventional pet enclosures.

BRIEF DESCRIPTION OF THE DRAWINGS

FIG. 3 is a perspective view of the cat carrier shown in FIG. 1 with the carrier's front panel in an attached-inserted position.

FIG. 4 is a perspective view similar to FIG. 3 but showing the carrier's front panel is an attached-extended position.

FIG. 5 is an exploded perspective view similar to FIG. 4 but showing the carrier's front panel in a removed position.

FIG. 19 is a block diagram illustrating an example cat carrier method that can be used with at least one of the example cat carriers disclosed herein.

DETAILED DESCRIPTION

Figure 1:
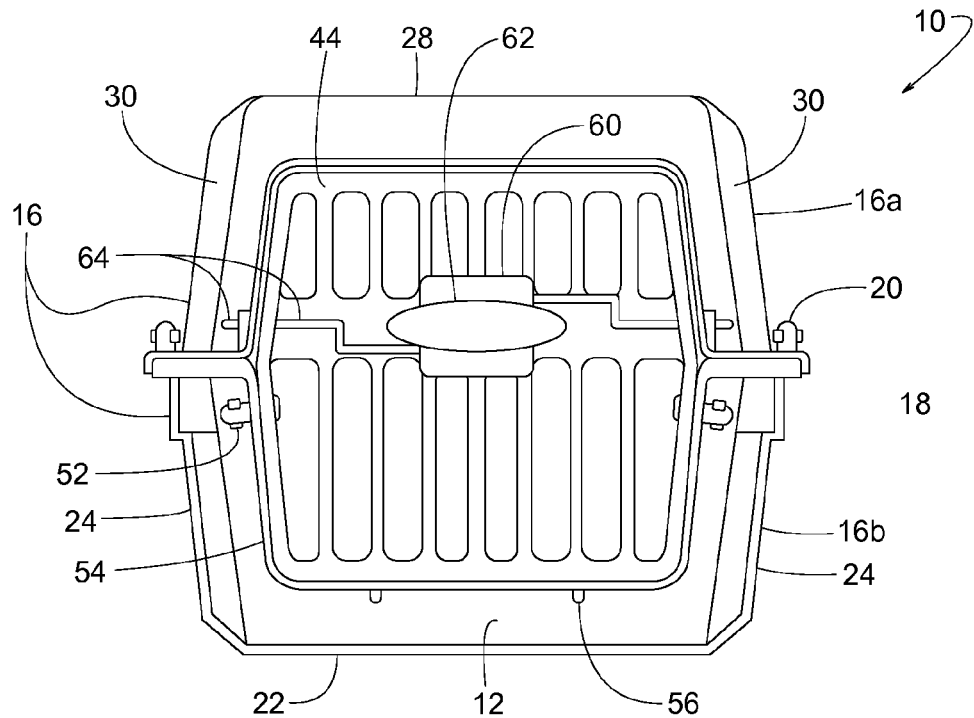
FIG. 1 is a front end view of an example cat carrier constructed in accordance with the teachings disclosed herein.

FIGS. 1-14 illustrate example carriers and associated methods for confining, sheltering and/or transporting cats. Some example carriers and methods involve the use of a translating floor to safely transfer cats in and out of the carriers. Sliding a floor out from within an outer housing provides unobstructed access to the cat. Sliding the floor into the housing mildly destabilizes the cat's footing such that the cat tends to crouch down into the carrier rather than jumping out of it.

In the example shown in FIGS. 1-11, a cat carrier 10 comprises an insert 12 with a floor 14 that can be slid within an outer housing 16. In this example, outer housing 16 comprises an upper shell 16a and a lower shell 16b. In some examples, shells 16a and 16b are integrally combined as a unitary seamless piece. In the illustrated example, however, shells 16a and 16b are individual pieces that are connected at a joint 18 held together by a series of conventional fasteners 20. Lower shell 16b includes a bottom 22 and two lower side walls 24 extending up from bottom 22. Lower shell 16b also has and a lower back wall 26 extending up from bottom 22 and extending laterally between lower side walls 24.

Upper shell 16a, in this example, includes a roof 28 and two upper side walls 30 extending down from roof 28. For portability, a fold-down carrying handle 32, in some examples, is attached to roof 28. Roof 28 extends from a front edge 28a to a rear edge 28b. Upper shell 16a also has an upper back wall 34 that extends down from the roofs rear edge 28b and extends laterally between upper side walls 30. When shells 16a and 16b are together, outer housing 16 provides a chamber 36 defined by bottom 22, roof 28 and walls 30, 34, 24 and 26.

Figure 2:
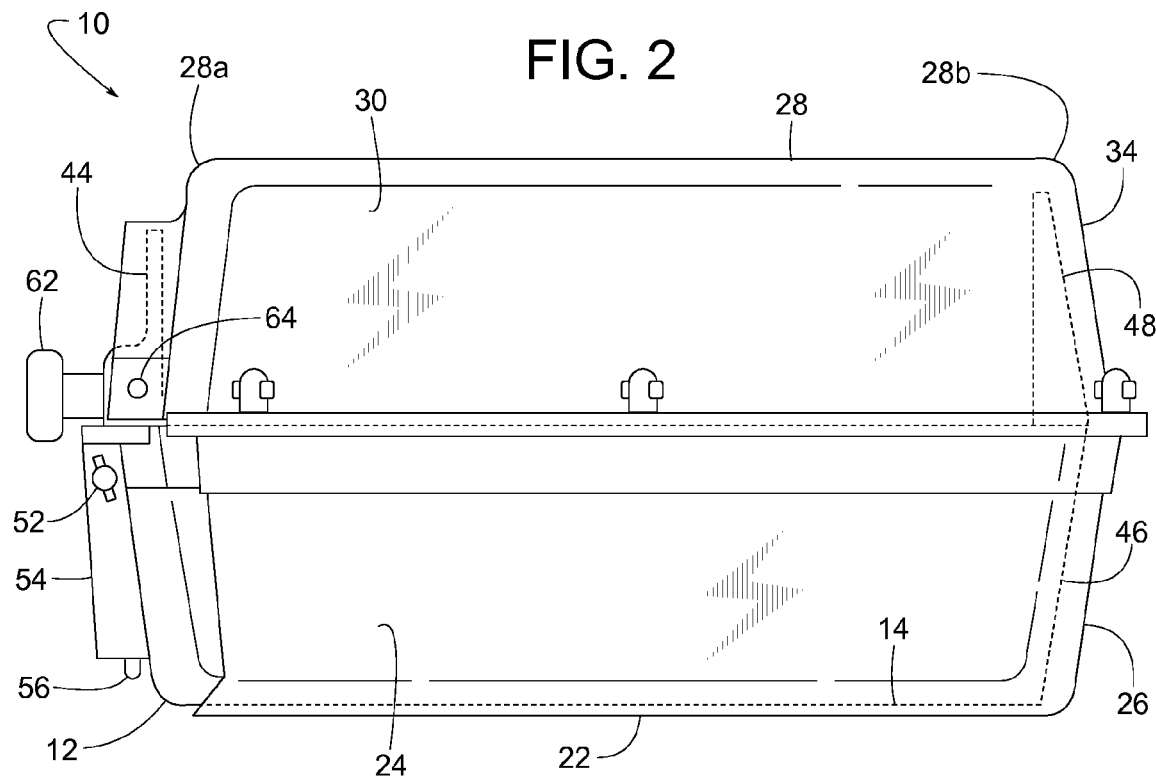
FIG. 2 is a right side view of FIG. 1.
Figure 6:
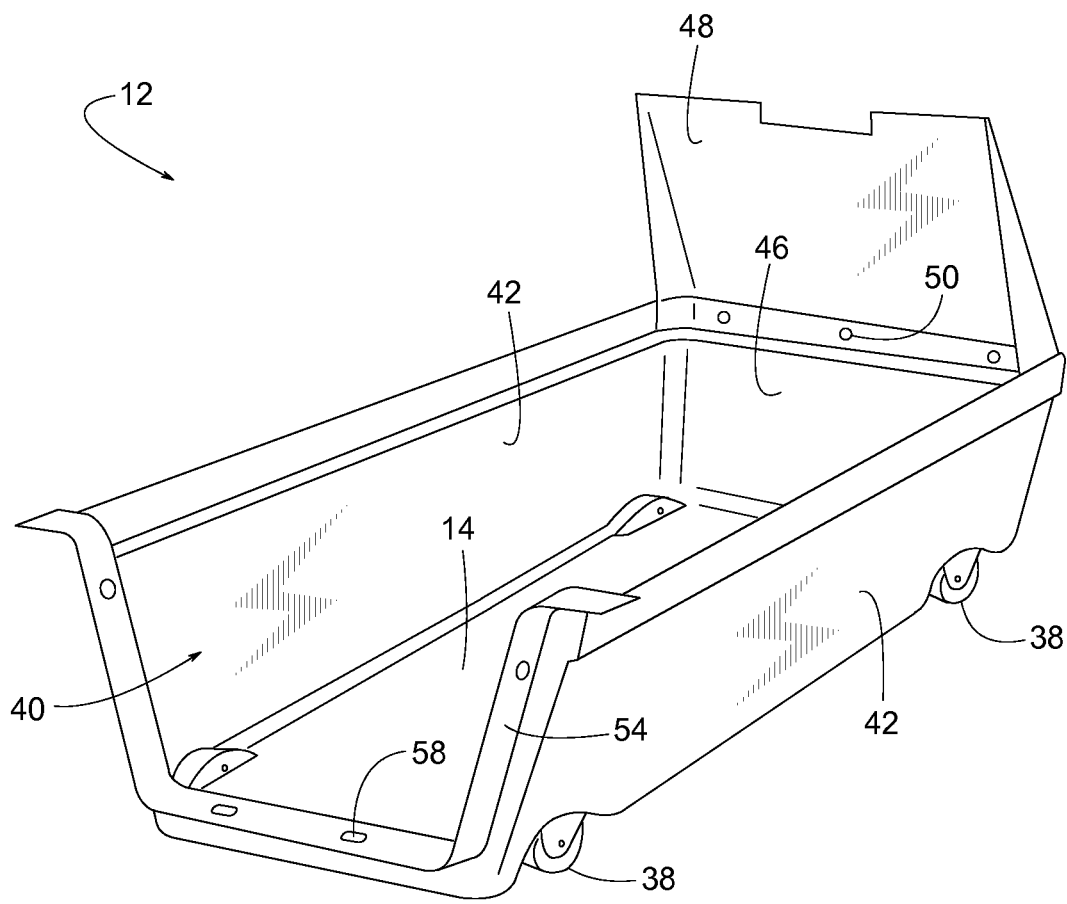
FIG. 6 is a perspective view of an example insert used in example cat carriers constructed in accordance with the teachings disclosed herein.
Figure 7:
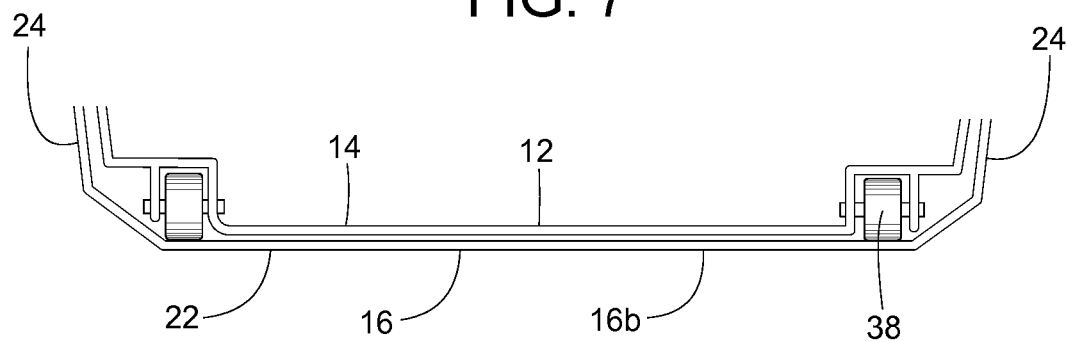
FIG. 7 is a cross-sectional end view show the roller portion of the insert shown in FIG. 6.
Figure 8:
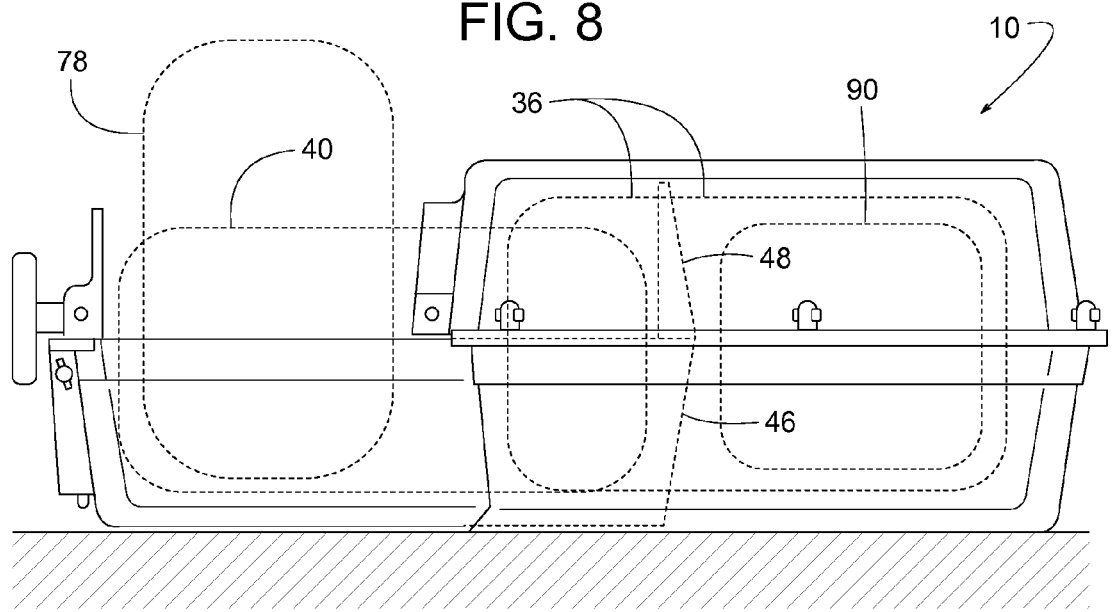
FIG. 8 is a side view similar to FIG. 2 but showing the cat carrier open.

Insert 12 can be slid in and out of chamber 36. The term, "slid" and derivatives thereof refer to translating motion that in some examples is assisted by one or more rollers 38 interposed between insert 12 and housing 16, as shown in FIG. 7. In some examples, rollers 38 are mounted to insert 12, as shown in FIG. 6. FIGS. 1-3 show insert 12 in an inserted position within chamber 36, and FIGS. 4, 5 and 8-11 show insert 12 in an extended position relative to outer housing 16.

In the illustrated example, insert 12 has a pet receptacle 40 defined by floor 14, two side panels 42, a front panel 44, an impassable back panel 46 and an impassable rear barrier 48. In some examples, the various parts of insert 12 are integrally combined to render insert 12 as a unitary seamless piece. In some examples, just two or more of the insert's parts are integrally combined while the remaining parts are connected.

In the illustrated example, back panel 46, floor 14 and side panels 42 are integral extension of each other while conventional fasteners 50 attach rear barrier 48 to back panel 46. In other examples, rear barrier 48 is a seamless integral extension of back panel 46, whereby barrier 48 and panel 46 are combined as a seamless unitary piece.

In some examples, front panel 44 serves as an optional door that is movable selectively to a removed position (FIG. 5), an attached-extended position (FIG. 4), and an attached-inserted position (FIG. 3). FIG. 5 is an example of front panel 44 being open with respect to side panels 42, and FIGS. 3 and 4 are examples of front panel 44 being closed with respect to side panels 42. In the illustrated example, conventional fasteners 52 selectively attach front panel 44 to a forward protruding flange 54 of side panels 42 while lower protrusions 56 extending down from front panel 44 extend into holes 58 in flange 54 to help hold front panel 44 in place.

Some examples of front panel 44 have an actuator 60 with a dual purpose handle 62. When handle 62 is in the position shown in FIGS. 1-3, rods 64 of actuator 60 extend laterally into holes 66 to hold front panel 44 closed. When handle 62 is rotated to the position shown in FIGS. 4 and 5, rods 64 retract out from within holes 66 to unlatch front panel 44. Once unlatched, handle 62 provides a convenient means for pulling insert 12 out from within outer housing 16, as shown in FIG. 4.

Figure 9:
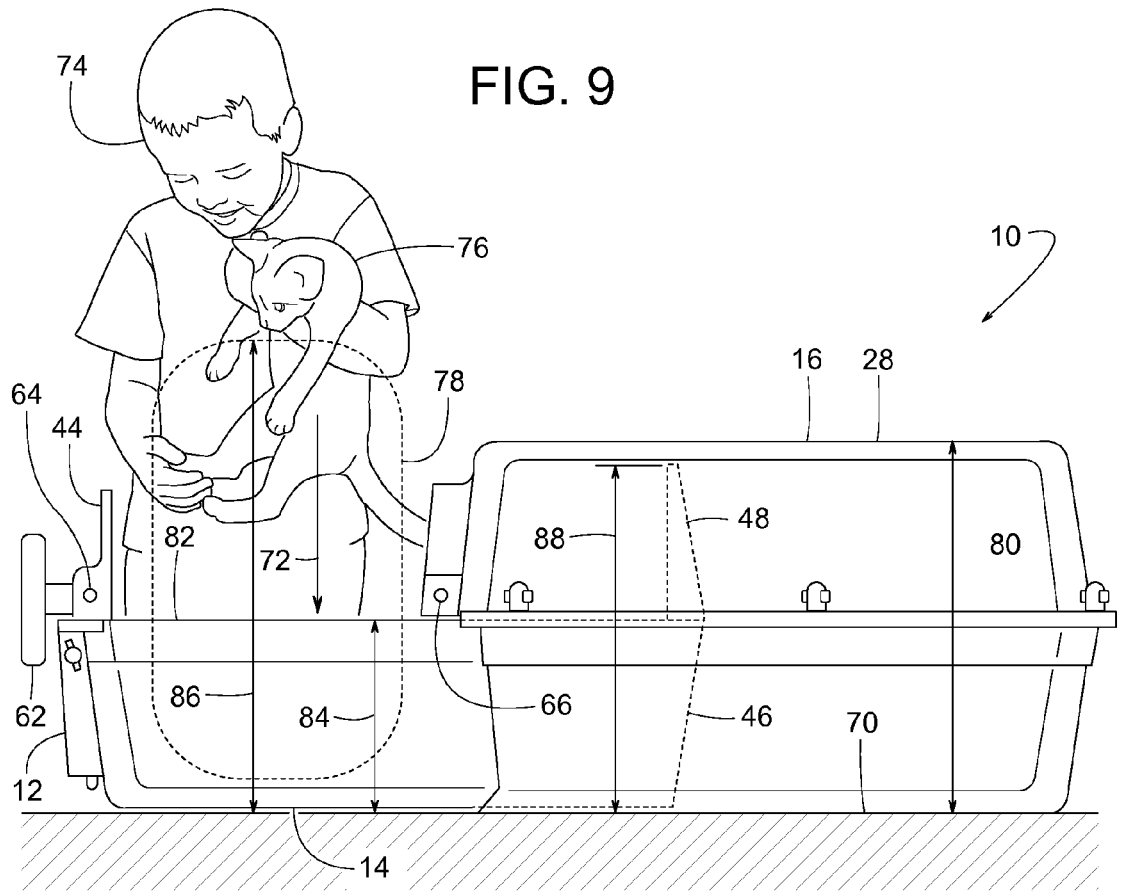
FIG. 9 is a side view showing a cat being lowered onto the floor of the container's insert.
Figure 10:
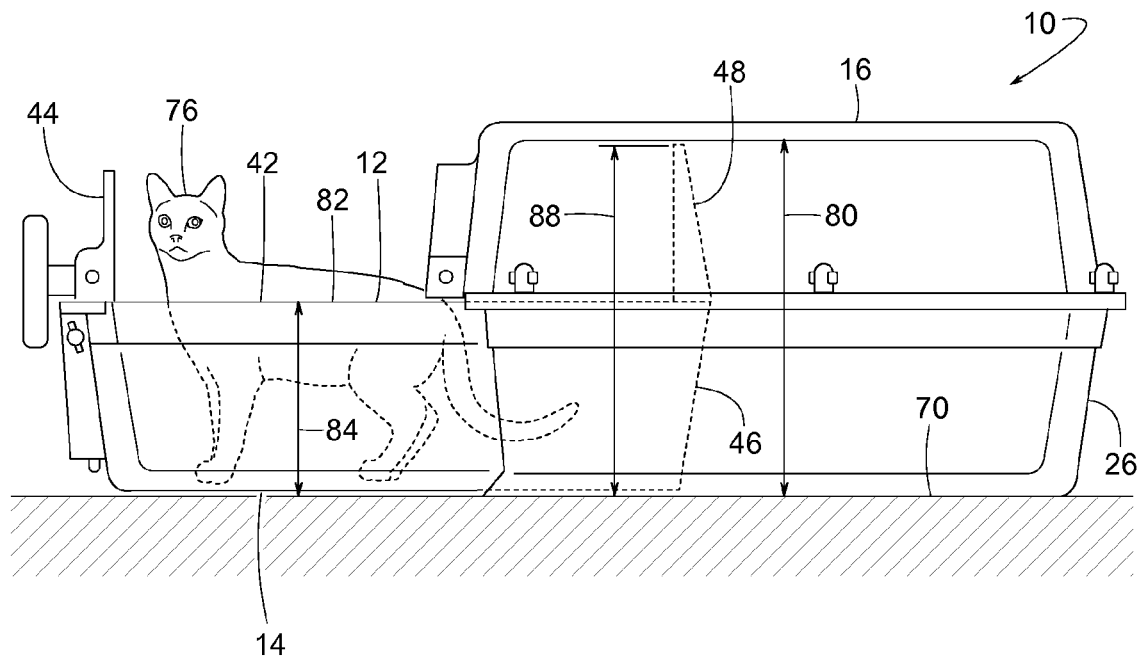
FIG. 10 is a side view similar to FIG. 9 but showing the cat standing upright on the insert's floor.
Figure 11:
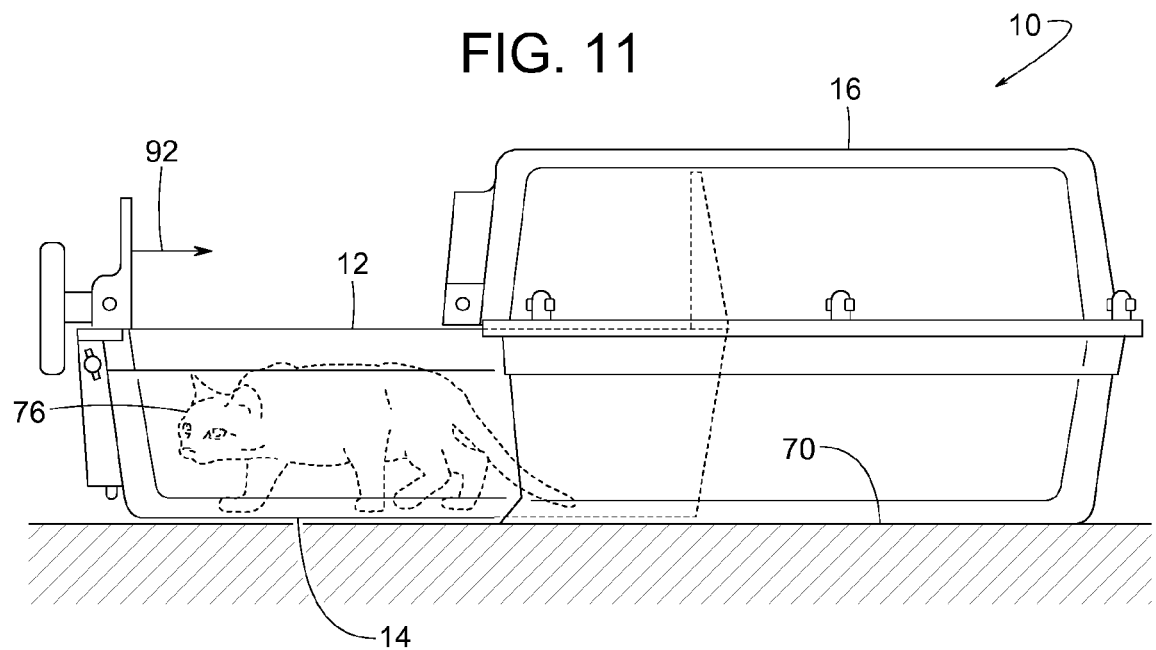
FIG. 11 is a side view similar to FIG. 10 but showing the cat crouching down in reaction to the insert being slid into the carrier's outer housing.

Cat carrier 10 can be used according to the example sequence shown in FIGS. 9, 10 and 11. FIG. 9 shows cat carrier's outer housing 16 set upon a stationary base 70 (e.g., table, countertop, floor, etc.) with insert 12 extended. The term, "stationary" means fixed relative to Earth. Arrow 72 represents a veterinarian assistant 74 lowering a cat 76 down onto the insert's floor 14. Upon doing so, cat 76 passes through an open-air space 78 that provides a generally unobstructed passageway from above roof 28 down to floor 14.

In some examples, roof 28 is at a first height 80 above base 70, an uppermost edge 82 of insert side panel 42 is at a second height 84 (upper edge height), and open-air space 78 is at a third height 86. Third height 86 is greater than first height 80 to facilitate lowering cat 76 onto the insert's floor 14, and second height 84 is less than 75 percent of first height 80 to provide cat 78 (once lowered onto floor 14) with a calming, unrestricted side view. The open grate of front panel 44 might further help cat 76 feel less confined. With the freedom to look around, cat 76 is perhaps less likely to jump out once cat 76 is standing comfortably on the insert's floor 14, as shown in FIG. 10.

While the relative heights 80, 84 and 86 can be important, a height 88 of rear barrier 48 can play an important role as well. If side panel height 84 and rear barrier height 88 were both significantly less than roof height 80, cat 76 could possibly jump over rear barrier 48 from receptacle 40 into chamber 36 and land in a trapped area 90 between the insert's back panel 46 and the outer housing's lower back wall 26. This can create two problems: one, subsequently inadvertently forcing the unoccupied insert 12 back into housing 16 could crush cat 76 in trapped area 90, and two, it might be very difficult and hazardous to reach in and remove cat 90 out from within trapped area 90. Consequently, some examples of rear barrier 48 have barrier height 88 slightly less than roof height 80 (less than 3 inches between heights 88 and 80) and have barrier height 88 significantly greater than side panel height 84. In some examples, front panel 44 extends above side panel 42 so that front panel 44 can effectively close and contain cat 76. The term, "height," as used throughout this patent, is a vertical distance measured with reference to a cat carrier's lowermost surface intended for resting upon base 70. As shown in FIG. 6, side walls 42 can be shorter than the back panel 46 and rear barrier 48, which form a rear wall.

Next in the sequence of use, assistant 74 pushes insert 12 into outer housing 16, as shown in FIG. 11. Sliding motion 92 of the insert's floor 14 mildly destabilizes the cat's footing such that cat 76 tends to crouch down to perhaps regain its balance, as shown in FIG. 11. This places cat 76 in the perfect position for sliding insert 12 completely into outer housing 16.

Figure 12:
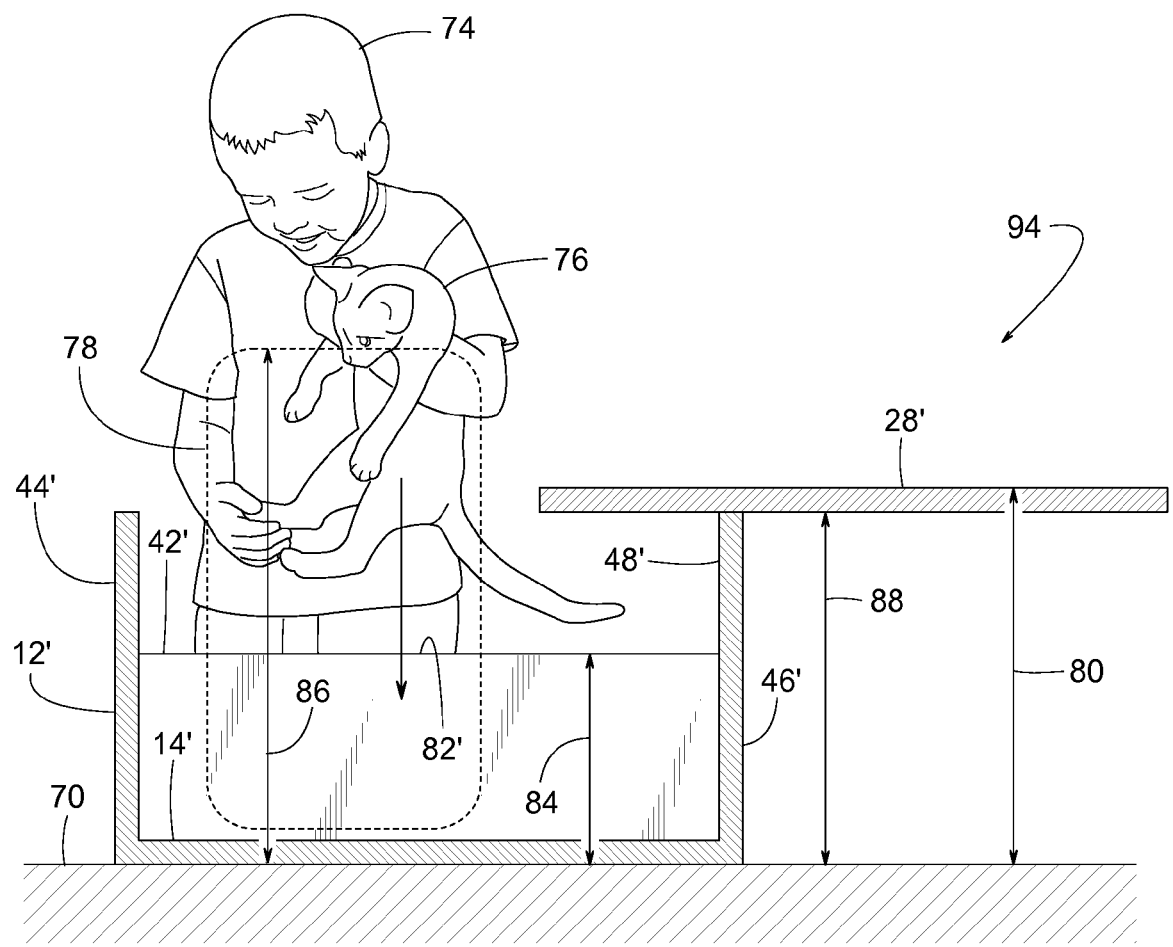
FIG. 12 is a cross-sectional side view similar to FIG. 9 but showing the cat being lowered onto the insert floor of another example cat carrier constructed in accordance with the teachings disclosed herein.
Figure 13:
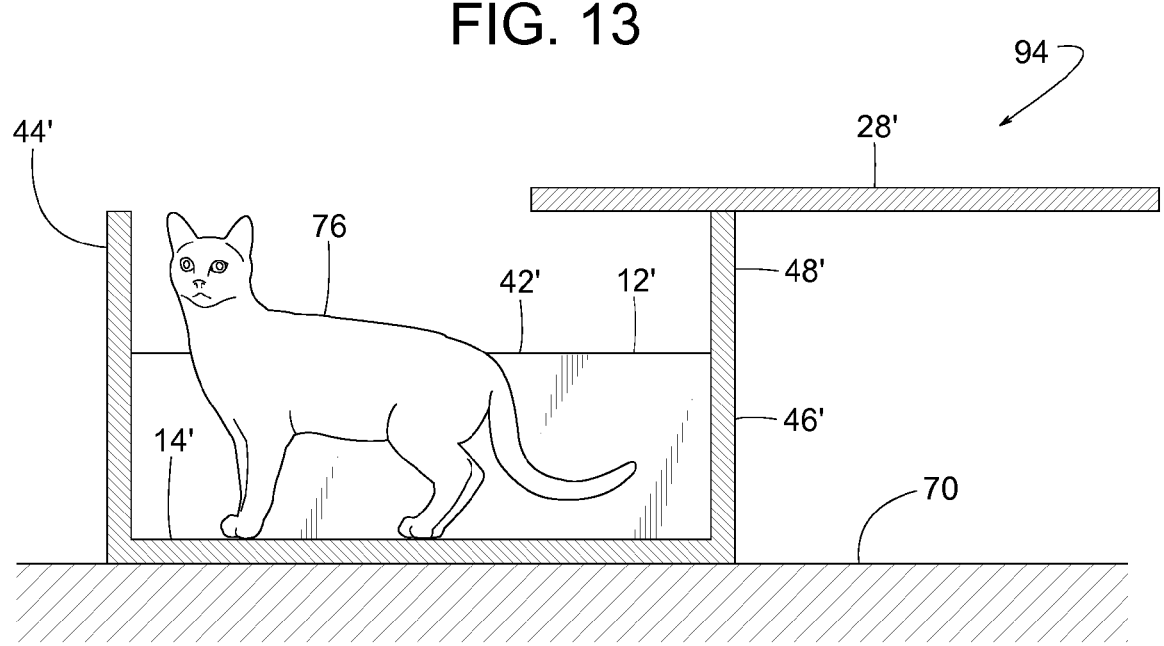
FIG. 13 is a cross-sectional side view similar to FIG. 12 but showing the cat standing upright on the insert's floor.
Figure 14:
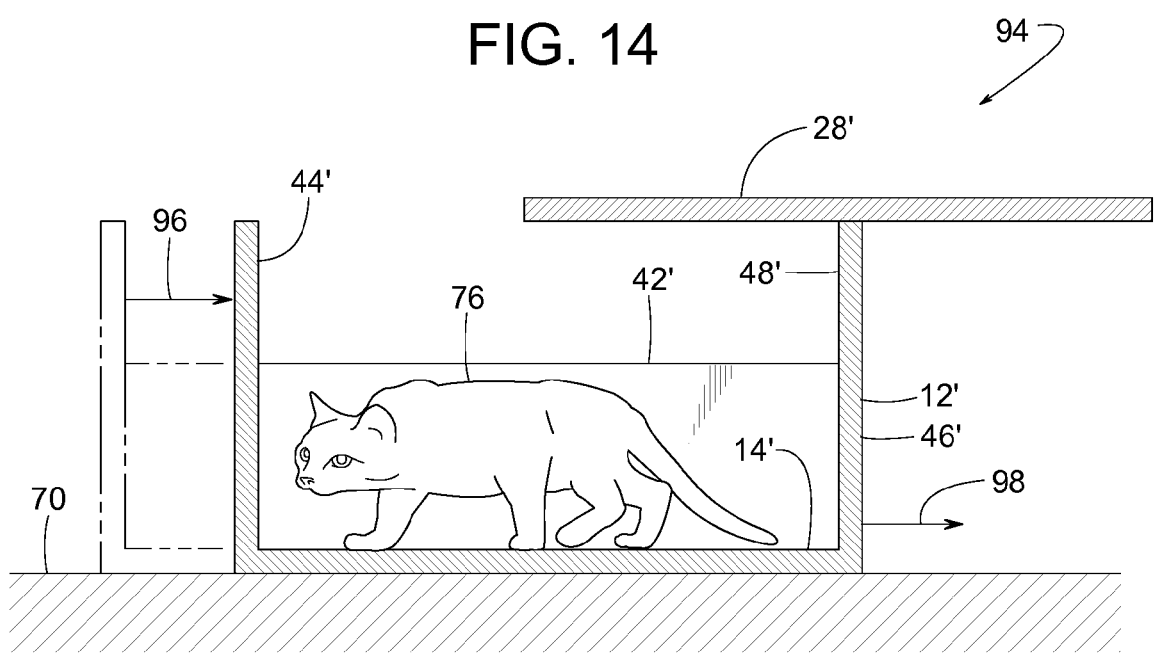
FIG. 14 is a cross-sectional side view similar to FIG. 13 but showing the cat crouching down in reaction to the insert being slid into the carrier's outer housing.

FIGS. 12-14 show a similar example cat carrier 94 and sequence of use, wherein FIGS. 12, 13 and 14 correspond to FIGS. 9, 10 and 11, respectively. In this example, cat carrier 94 comprises an insert 12' that can be manually slid underneath a stationary roof 28'. Insert 12' comprises a front panel 44', a back panel 46' with an integral rear barrier 48', a floor 14' and two side panels 42'. FIG. 12 shows assistant 74 lowering cat 76 onto floor 14', FIG. 13 shows cat 76 standing on floor 14', and arrows 96 and 98 of FIG. 14 represents assistant 74 sliding the insert's floor 14' underneath roof 28' while cat 76 is on floor 14' and roof 28' is kept relatively stationary. The terms, "relatively stationary" and "substantially stationary" as they pertain to an outer housing or a roof means that the housing and/or roof move less than an insert or floor as the insert or floor is being slid underneath the roof. Roof 28' can be kept stationary by any suitable or convenient means. Examples of such means include, but are not limited to, manually holding roof 28' still and/or supporting roof 28' by an outer enclosure, side wall or other structure that is resting on top of base 70.

Figure 15:
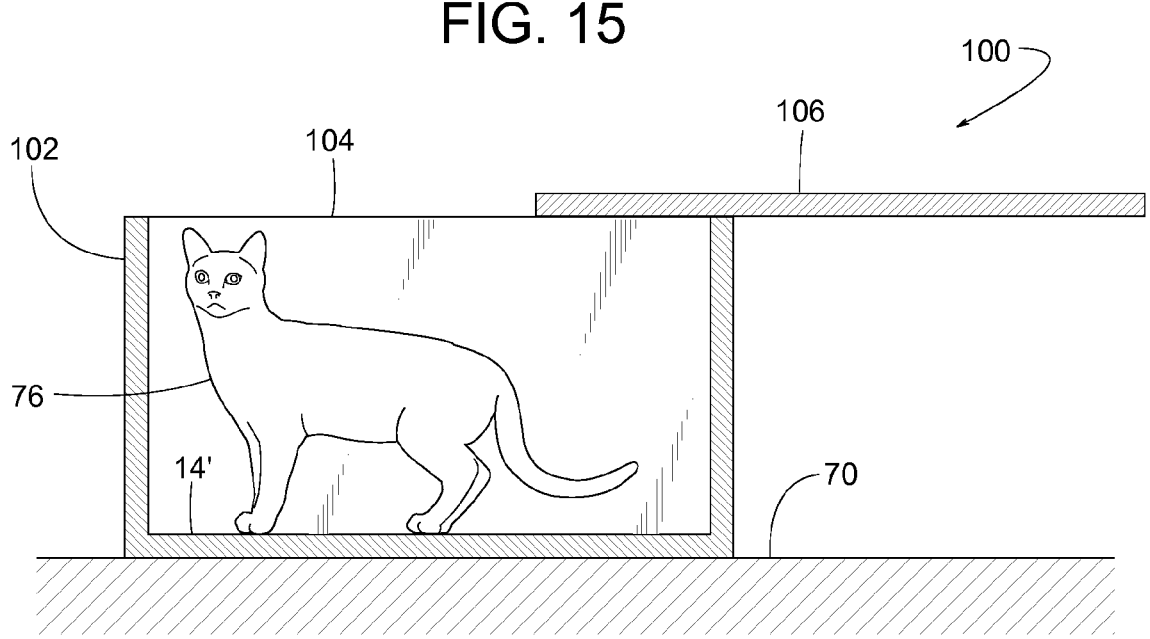
FIG. 15 is a cross-sectional side view similar to FIGS. 10 and 13 but showing the cat standing upright on the insert floor of another example cat carrier constructed in accordance with the teachings disclosed herein.
Figure 16:
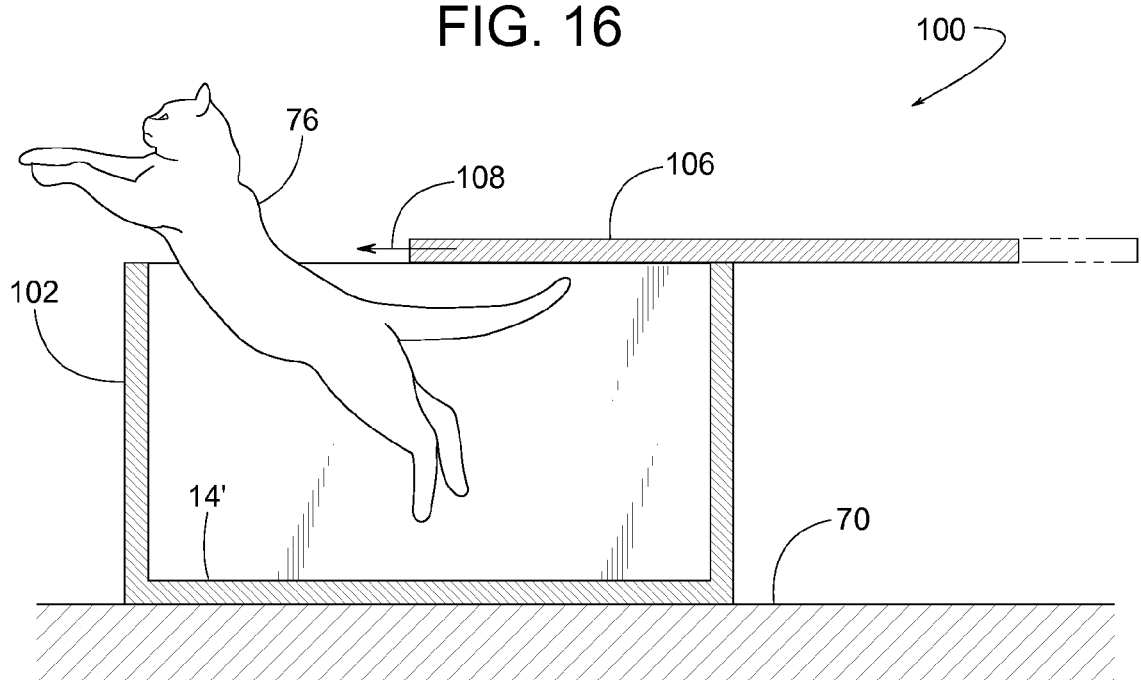
FIG. 16 is a cross-sectional side view similar to FIG. 15 showing the cat's potential reaction to the roof sliding over a relatively stationary insert rather than the insert sliding underneath a relatively stationary roof.

FIGS. 15 and 16 show an alternate example cat carrier 100 that is similar to cat carrier 94 but with subtle yet key structural and functional differences. FIGS. 15 and 16 correspond to FIGS. 13 and 14, respectively. Structurally, an insert 102 of cat carrier 100 has significantly higher side panels 104 that can disconcertingly obstruct the cat's side view, thereby perhaps making cat 76 feel more confined and want to escape. Functionally, instead of sliding insert 102 underneath a roof 106 that is relatively stationary, roof 106 is slid 108 across the top of insert 102 and toward cat 76. In this example, since cat 76 retains a firm footing on stationary floor 14', cat 76 might have a natural tendency to simply jump out to avoid the approaching roof 106, as shown in FIG. 16.

Figure 17:
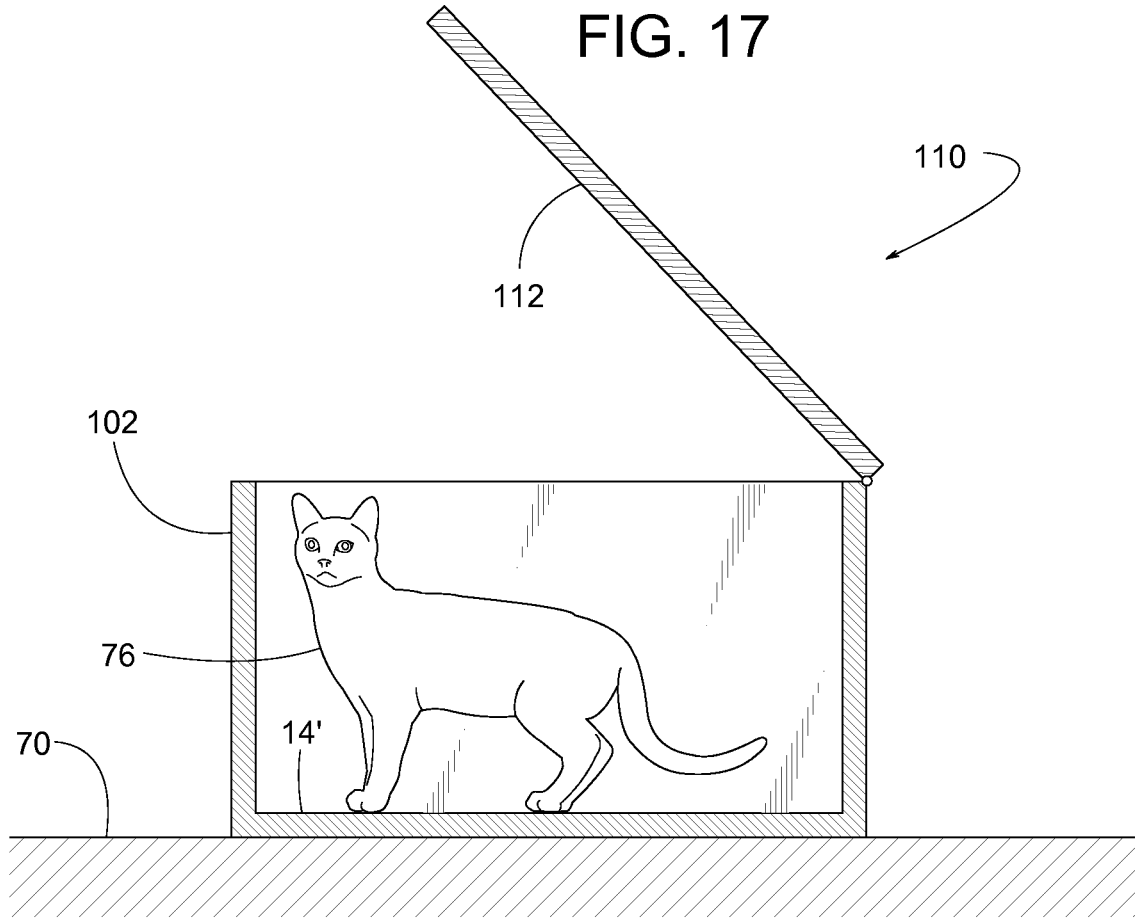
FIG. 17 is a cross-sectional side view similar to FIG. 15 but showing the cat standing upright on the insert floor of another example cat carrier constructed in accordance with the teachings disclosed herein.
Figure 18:
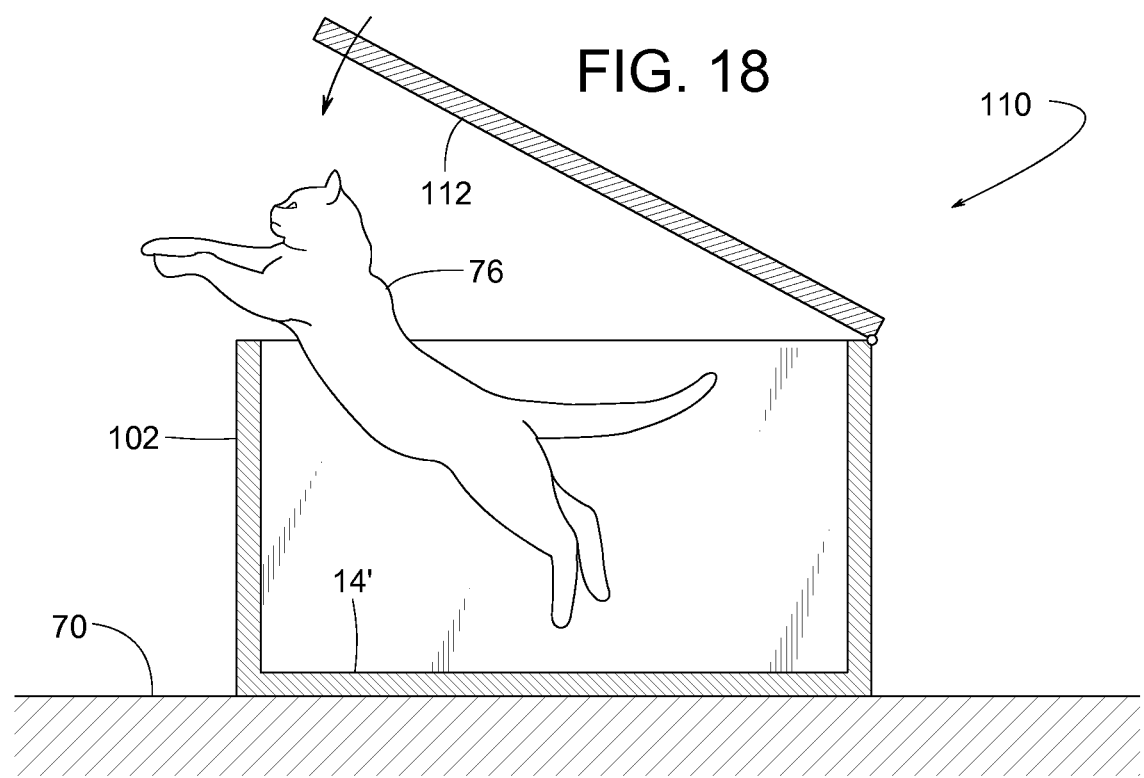
FIG. 18 is a cross-sectional side view similar to FIG. 17 showing the cat's potential reaction to the roof tipping over a relatively stationary insert.

FIGS. 17 and 18 show an example cat carrier 110 that is similar to cat carrier 100 with FIGS. 17 and 18 corresponding to FIGS. 15 and 16, respectively. Instead of sliding roof 106 over the top of insert 102, as shown in FIG. 16, a roof 112 pivots down over insert 102, as shown in FIG. 18. In this example, since cat 76 retains a firm footing on stationary floor 14', cat 76 might have a natural tendency to simply jump out to avoid the descending roof 112.

FIG. 19 illustrates an example cat carrier method 114, wherein block 116 represents selecting base 70 that is substantially stationary. Block 118 represents positioning roof 28' at a substantially stationary location relative to base 70 such that roof 28' is at first height 80 above base 70. Block 120 represents providing floor 14' of insert 12' that is movable relative to roof 28'. Block 122 represents extending insert side panel 42' up from floor 14' such that uppermost edge 82' of insert side panel 42' is at second height 84 above base 70, wherein second height 84 is less than 75 percent of first height 80. Block 123 represents providing open-air space 78 extending continuously upward from floor 14' to third height 86 that is greater than first height 80.

And blocks 124 and 126 represents lowering cat 76 down through open-air space 78 onto floor 14' of insert 12'. Block 128 represents sliding floor 14' underneath roof 28' while cat 76 is on floor 14' and roof 28' is substantially stationary.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A pet carrier comprising:
   an outer housing comprising a roof and side wall portions, said outer housing defining a chamber having a front opening;
   an insert comprising a floor, said insert defining a pet receptacle, said insert having an open top;
   a back wall; and
   a front panel;
   wherein said insert is moveable with respect to said outer housing between a first orientation and a second orientation, in said first orientation said insert disposed within said chamber, said front panel blocking said front opening, said front panel attached to said outer housing and attached to said insert, in said second orientation said insert at least partially removed from said chamber and said front panel disengaged from said outer housing.

2. The pet carrier of claim 1, said front panel comprising a handle.

3. The pet carrier of claim 2, wherein said handle operates a locking mechanism arranged to engage said front panel to said outer housing.

4. The pet carrier of claim 3, wherein said locking mechanism comprises a rod arranged to pass through an aperture in said outer housing.

5. The pet carrier of claim 1, wherein said front panel is attached to said insert and moveable between first and second positions with respect to said insert.

6. The pet carrier of claim 2, said outer housing comprising a carrying handle.

7. The pet carrier of claim 1, wherein said insert comprises said back wall.

8. The pet carrier of claim 7, said insert comprising side walls, said side walls being shorter than said back wall.

9. The pet carrier of claim 1, wherein said outer housing comprises said back wall, said insert further comprising a rear barrier.

10. The pet carrier of claim 9, said insert comprising side walls, said side walls being shorter than said rear barrier.

11. The pet carrier of claim 1, comprising a roller disposed between said insert and said outer housing.

12. The pet carrier of claim 1, said outer housing defining a channel, said insert comprising a protrusion positioned in said channel, said protrusion slidable in said channel.

13. A pet carrier comprising:
    an outer housing comprising a roof, a first side wall, a second side wall and a back wall, said outer housing defining a chamber having a front opening; and
    an insert comprising a front panel, a floor and side portions, said insert defining a pet receptacle, said insert having an open top;
    wherein said insert is moveable with respect to said outer housing between a first orientation and a second orientation, in said first orientation said insert disposed within said chamber, said front panel blocking said front opening and said front panel attached to said outer housing, in said second orientation said insert at least partially removed from said chamber and said front panel disengaged from said outer housing.

14. The pet carrier of claim 13, said insert comprising a handle.

15. The pet carrier of claim 14, wherein said handle operates a locking mechanism arranged to engage said front panel to said outer housing.

16. The pet carrier of claim 15, wherein said locking mechanism comprises a rod arranged to pass through an aperture in said outer housing.

17. The pet carrier of claim 13, said outer housing comprising a carrying handle.

18. The pet carrier of claim 13, said insert comprising a rear barrier, said side portions being shorter than said rear barrier.

19. The pet carrier of claim 13, comprising a roller disposed between said insert and said outer housing.

20. The pet carrier of claim 13, said first side wall defining a channel, said insert comprising a protrusion positioned in said channel, said protrusion slidable in said channel.

* * * * *